United States Patent
Yoritsune et al.

(10) Patent No.: US 6,856,261 B2
(45) Date of Patent: Feb. 15, 2005

(54) ROTARY ENCODER

(75) Inventors: Yasuhiro Yoritsune, Okayama (JP); Kenji Kataoka, Okayama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/757,485

(22) Filed: Jan. 15, 2004

(65) Prior Publication Data

US 2004/0164879 A1 Aug. 26, 2004

(30) Foreign Application Priority Data

Jan. 16, 2003 (JP) ........................................ 2003-007977

(51) Int. Cl.$^7$ ........................... H03M 1/22; H01H 19/00
(52) U.S. Cl. .......................... 341/16; 341/17; 200/11 R; 200/11 DA
(58) Field of Search ................... 341/16, 17; 200/11 A, 200/11 D, 11 DA, 11 G, 11 H, 11 R

(56) References Cited

U.S. PATENT DOCUMENTS 4,212,000 A * 7/1980 Yamada ...................... 396/258
6,340,801 B1 * 1/2002 Fukuda et al. ............. 200/11 G
6,784,383 B2 * 8/2004 Sugahara et al. ......... 200/11 R

FOREIGN PATENT DOCUMENTS

JP          7-141960          6/1995

* cited by examiner

*Primary Examiner*—Howard L. Williams
(74) *Attorney, Agent, or Firm*—Wenderoth, Lind & Ponack, L.L.P.

(57) ABSTRACT

A rotary encoder has housing case provided with common electrode and signal electrode disposed to an area narrower than the entire circumference, or an angular range of generally ½ of the circumference in concentrical with central hole of housing case, and sliding contact in a confronting manner to the electrodes, the sliding contact provided with four combinations of contacts points arranged at four equally divided angular positions, or every 90 degrees along the same circumference about the rotary axis, each of the combinations comprises contact point on inner side for connectively sliding on common electrode and two contact points on outer side for connectively sliding on signal electrode. The rotary encoder of this structure can reduce the cost by decreasing a width of material needed for fabrication of electrodes, and decrease distances for contact points to slide on electrodes, to thereby improve durability to sliding abrasion.

10 Claims, 8 Drawing Sheets

ROTARY ENCODER

TECHNICAL FIELD

The present invention relates to a rotary encoder for producing rectangular wave output in response to a rotational operation, and used for controlling an electronic apparatus, and the like.

BACKGROUND OF THE INVENTION

With the wide spread use of digital signal processing in a variety of electrical apparatuses in recent years, it has now become a mainstream for those apparatuses to employ digital signals for input and output of signals.

Rotary encoders are used in many cases for those apparatuses as electronic devices that output digital signals of rectangular waveforms.

Japanese Unexamined Patent Publication, No. H07-141960 shows one example of the conventional rotary encoders. In the above conventional rotary encoder, electrode 910 is disposed to cover entirely the circumference thereof, as shown in FIG. 13. Therefore, a sheet metal of good electrical conductivity, or a material to form electrode 910 needs to have at least width "W" of the electrode portion shown in FIG. 13. It was hence difficult to reduce a width dimension of the material.

Furthermore, due to advancement toward multi-functional capability of the apparatuses, rotary encoders used therein are operated more frequently than before. This trend has given rise to a problem of durability on many such rotary encoders since common contact point 953, first contact point 951 and second contact point 952 are all subjected to sliding abrasion of increased frequency and distance.

SUMMARY OF THE INVENTION

The present invention addresses the above problem of the prior art, and it aims to provide a rotary encoder of improved durability to sliding abrasion while realizing cost reduction by narrowing a width of material to fabricate an electrode portion.

In order to achieve the above object, a rotary encoder of this invention comprises a housing case provided with a common electrode and a signal electrode for each of outputs, and a sliding contact disposed in a rotatable manner to the housing case. The common electrode is formed within a first angular range along a first circumference. On the other hand, the signal electrode is formed within a second angular range along a second circumference which is concentric with the first circumference but of a different radius. The first angular range is equal to or slightly wider in angle than the second angular range. This rotary encoder outputs a continuous form of rectangular waves when contact points provided on the sliding contact slide regularly on the signal electrode and the common electrode.

Additional objects and advantages of the present invention will be apparent from the following detailed description of preferred embodiments thereof, which are best understood with reference to the accompanying drawings.

DESCRIPTION OF THE INVENTION

Description is provided first of a rotary encoder of a reference example which was used as a basic structure of the present invention.

Figure 10:
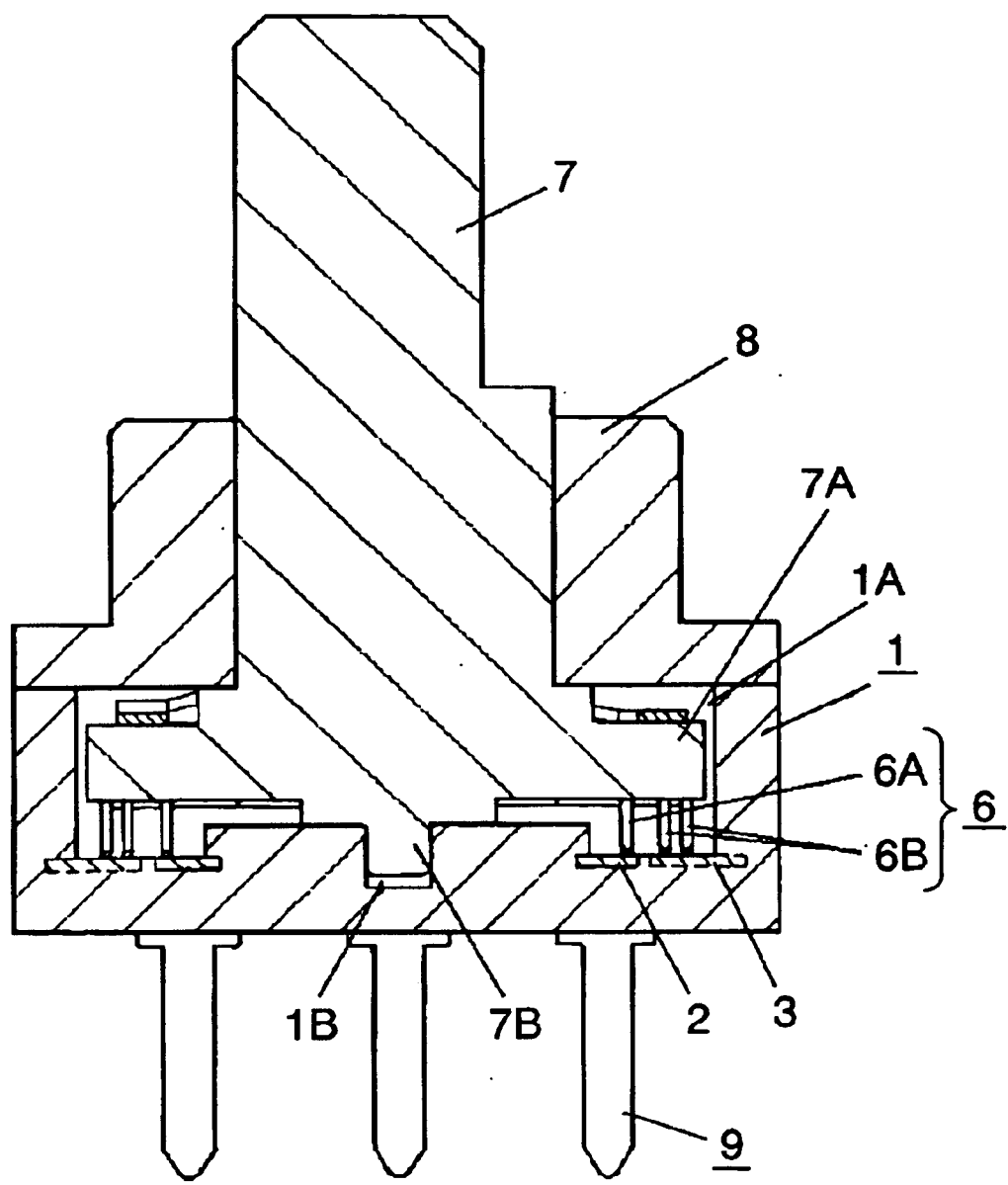
FIG. 10 is a sectional view depicting a rotary encoder of a reference example.

As shown in FIG. 10, housing case 1 made of an insulating resin is provided with common electrode 2 and signal electrode 3 made of a thin sheet metal of good electrical conductivity by die-cutting, on a bottom surface of open-top recess 1A. Sliding contact 6 made of a resilient sheet metal is attached to an underside surface of flange 7A of operating shaft 7 by riveting a mounting projection. Sliding contact 6 has contact points 6A and 6B for sliding on common electrode 2 and signal electrode 3.

Figure 11:
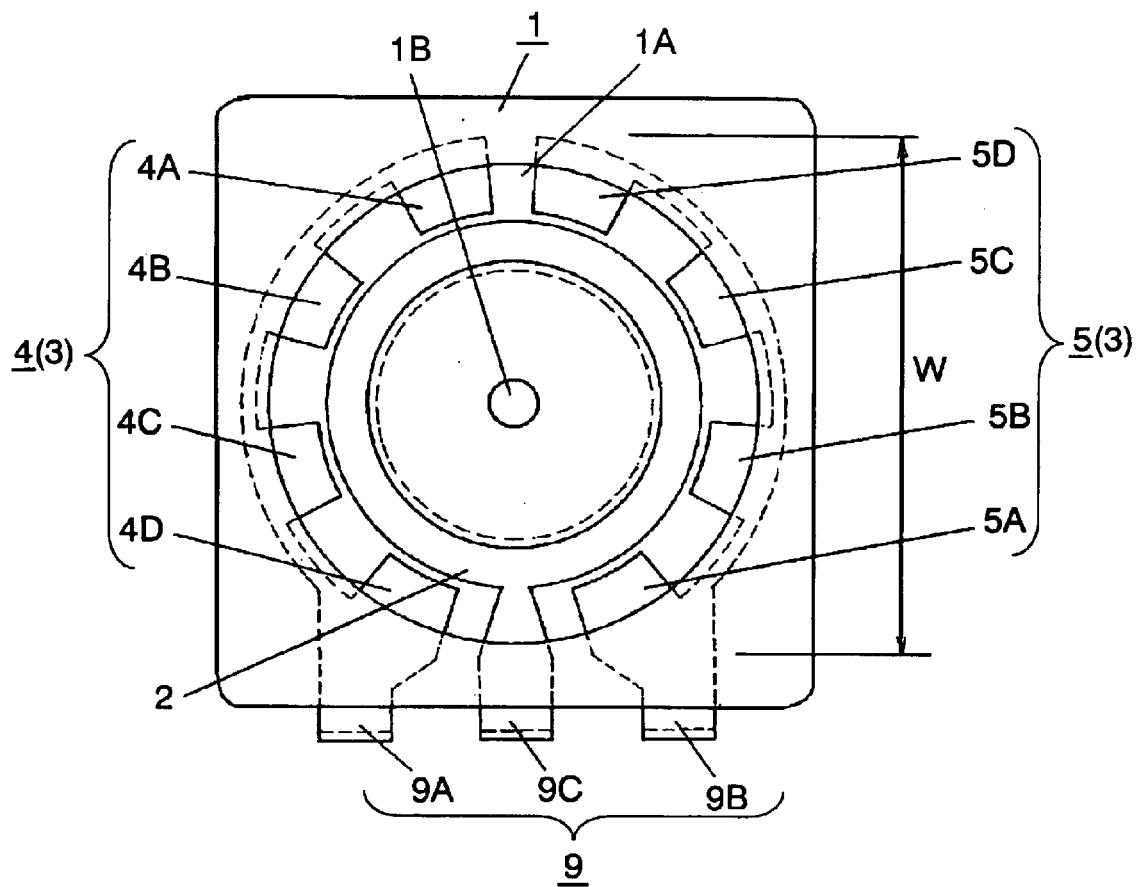
FIG. 11 is a plan view depicting a housing case of the rotary encoder of the reference example.

Operating shaft 7 is retained rotatably between central hole 1B in housing case 1 for supporting cylindrical projection 7B provided in the center bottom end of flange 7A and bearing 8 mounted to housing case 1 in a manner to cover the top opening of housing case 1. In FIG. 11, a central axis of rotation corresponds to the center point of central hole 1B.

Common electrode 2 is fixed to housing case 1 by insert molding so that it is positioned annularly around the entire circumference of housing case 1 in concentric with central hole 1B, as shown in FIG. 11. Signal electrode 3 comprises signal electrode 4 for A-phase and signal electrode 5 for B-phase which are fixed in confronting positions with respect to each other. Signal electrode 4 for A-phase is provided with four electrodes 4A through 4D along a circumference outside of and in concentric with common electrode 2, and signal electrode 5 for B-phase is provided similarly with four electrodes 5A through 5D, in respective areas dividing the circumference into two sections.

Signal electrode 4 for A-phase and signal electrode 5 for B-phase are so arranged that their positions are shifted by an angle ½ that of one of the electrodes along a direction of the circumference. Electrodes 4A and 5D are thus located close to each other whereas electrodes 4D and 5A are not, as shown in FIG. 11.

Common electrode 2, signal electrode 4 and signal electrode 5 are electrically isolated from one another, and connected to their respective terminals 9 (9A, 9B and 9C) extending to the outside of housing case 1, for connections with an external circuit.

Figure 12:
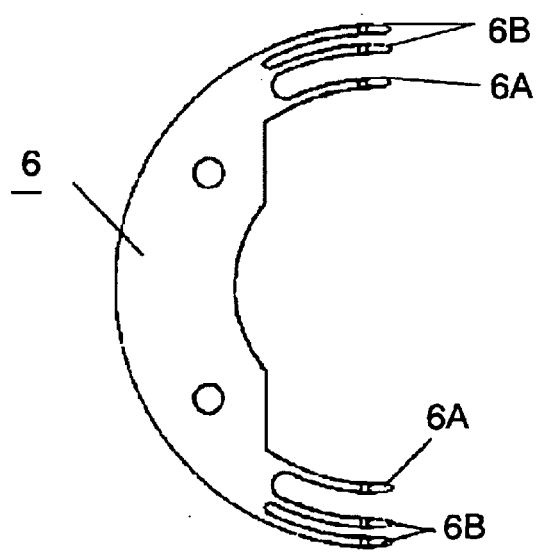
FIG. 12 is a plan view depicting a sliding contact of the rotary encoder of the reference example.
Figure 13:
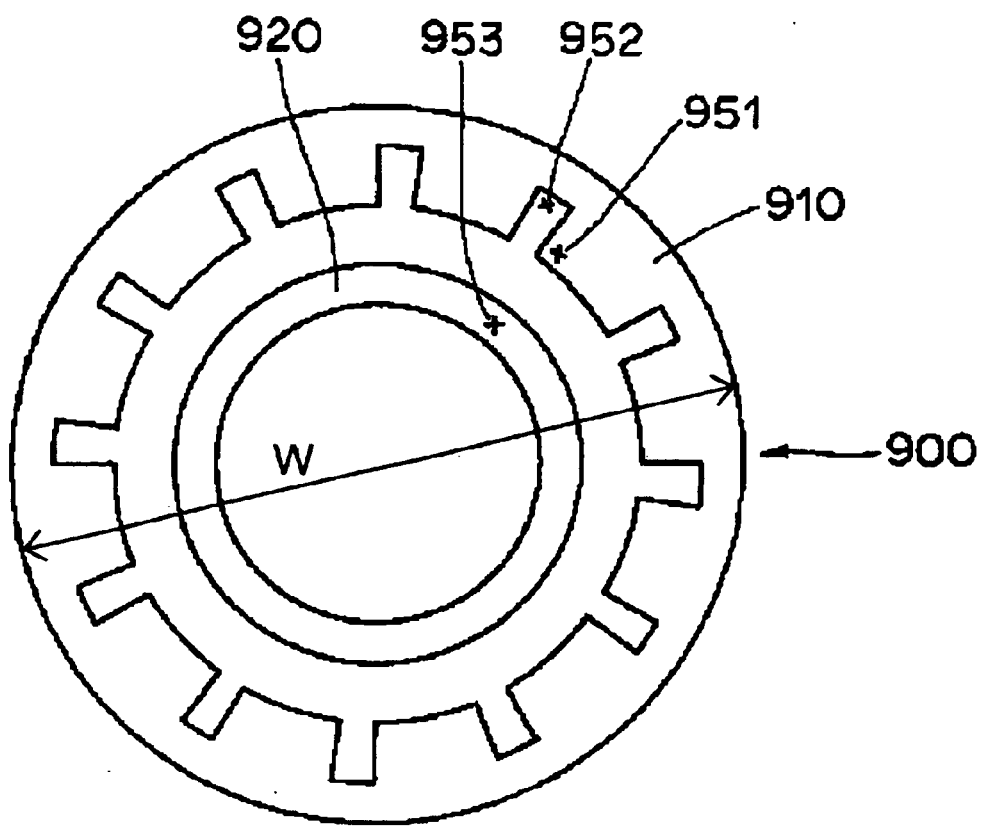
FIG. 13 is a diagrammatic illustration showing one configuration of electrodes of a rotary encoder of the prior art.

Sliding contact 6 secured to flange 7A of operating shaft 7 has a structure provided with two combinations of contacts points arranged point symmetrically at an angle of 180 degrees to each other about the rotary axis, and that each of the combinations comprises contact point 6A on inner side for sliding on common electrode 2 and two contact points 6B on outer side for sliding on signal electrode 3 located outside, as shown in FIG. 12. In other words, sliding contact 6 has two contact points 6A and four contact points 6B.

The conventional rotary encoder constructed as above operates in a manner which is described next. When operating shaft 7 is turned, each of contact points 6A on the inside of sliding contact 6 slides on common electrode 2 while maintaining an electrical continuity with it. On the other hand, contact points 6B on the outside slide over electrodes 4A to 4D and electrodes 5A to 5D one after another in a sequential manner (i.e., making and breaking electrical continuity), since signal electrodes 4 and 5 are formed into generally a comb-tooth pattern.

The sliding movement of contact points 6A and 6B produces an output of A-phase rectangular wave between terminals 9A and 9C, and another output of B-phase rectangular wave between terminals 9B and 9C of which rise point is shifted by ½ in phase. The above rotary encoder shown as a reference example produces a rectangular wave eight times each of A-phase and B-phase per each rotation of operating shaft 7. In the case of the above reference example, common electrode 2 and signal electrodes 3 are disposed to the entire circumferential area of housing case 1 by insert molding. Therefore, a sheet metal of good electrical conductivity, or the material used to form the electrodes needs to have at least width "W" of the electrode portion shown in FIG. 11. At the same time, durability of the rotary encoder needs to be improved further when it is adapted to multi-functional capability of an apparatus requiring frequent operation, which increases distances through which contact points 6A and 6B of sliding contact 6 slide on electrodes 2 and 3.

Referring to FIG. 1 through FIG. 9, description is now provided of exemplary embodiments of the present invention.

In the following embodiments, like reference numerals are used to denote like components as those described in the above reference example, and their detailed explanation will be skipped.

Exemplary Embodiment

Description is provided of a rotary encoder of this invention by referring to an exemplary embodiment.

Figure 1:
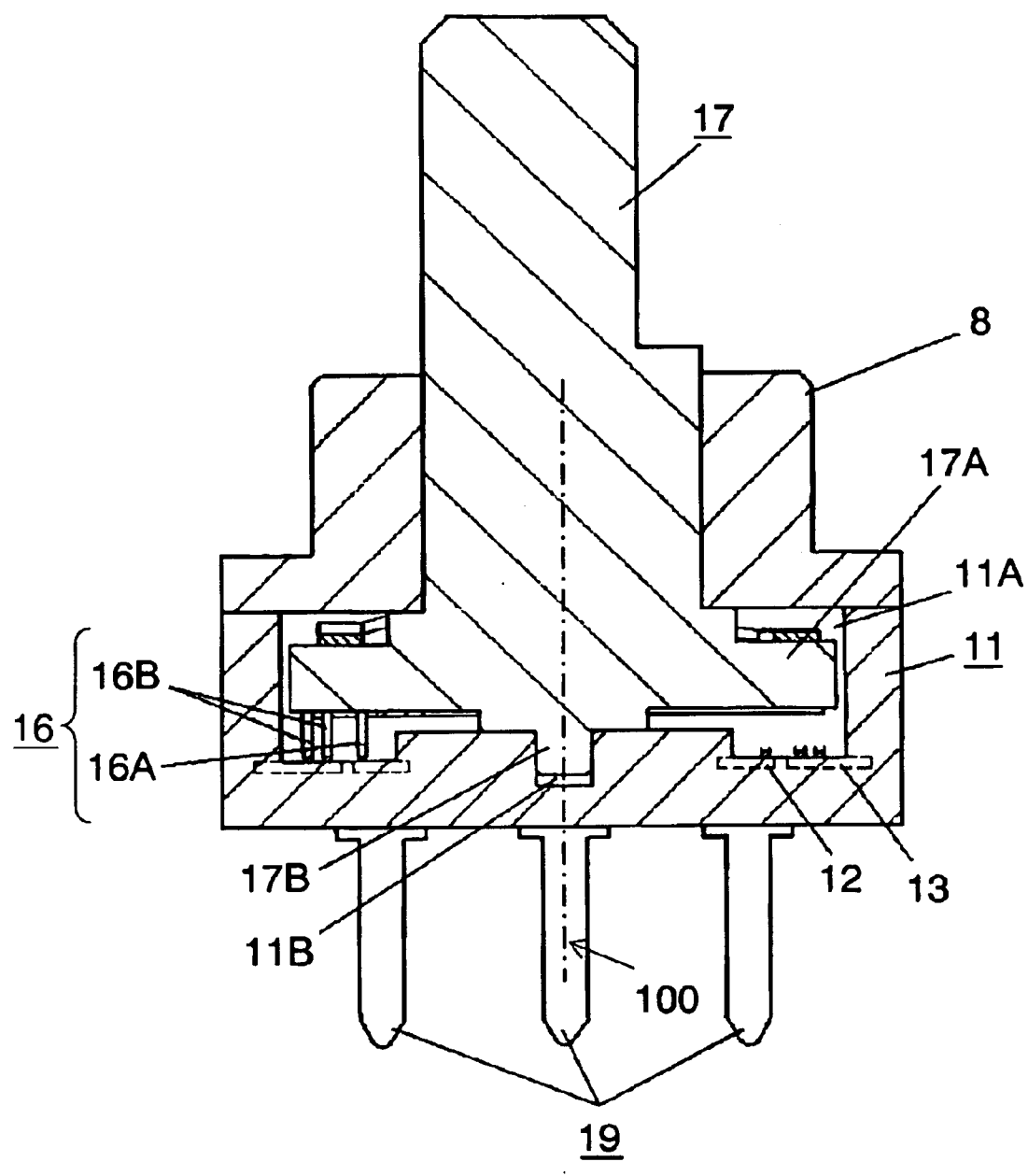
FIG. 1 is a sectional view of a rotary encoder according to an exemplary embodiment of this invention.

The rotary encoder described in this exemplary embodiment of the invention is an example so illustrated as to produce an output of rectangular wave eight times per each rotary operation like that of the reference example in order to make it easily understandable. FIG. 1 is an illustration depicting the rotary encoder according to the exemplary embodiment of this invention, and FIGS. 2 and 3 depict a housing case and a sliding contact respectively which are the essential components of the encoder.

As shown in FIG. 1, housing case 11 made of an insulating resin is provided on a bottom surface of open-top recess 11A with common electrode 12 and signal electrode 13, both of which are circular arc shape formed simultaneously from a thin sheet metal of good electrical conductivity. The circular arc shape here means that each of the electrodes is not formed into a complete circle like an annular ring, but it configures a section of circle.

Sliding contact 16 made of a resilient sheet metal having contact points 16A for sliding (i.e., traveling while making electrical contact) on common electrode 12 and contact points 16B for sliding on signal electrode 13 is attached to an underside surface of flange 17A of operating shaft 17. Operating shaft 17 has flange 17A and cylindrical projection 17B on the center bottom end of flange 17A. Projection 17B is retained rotatably in central hole 11B provided in housing case 1, and flange 17A is held rotatably by bearing 8 mounted to housing case 11 in a manner to cover the upper face of housing case 11.

Figure 2:
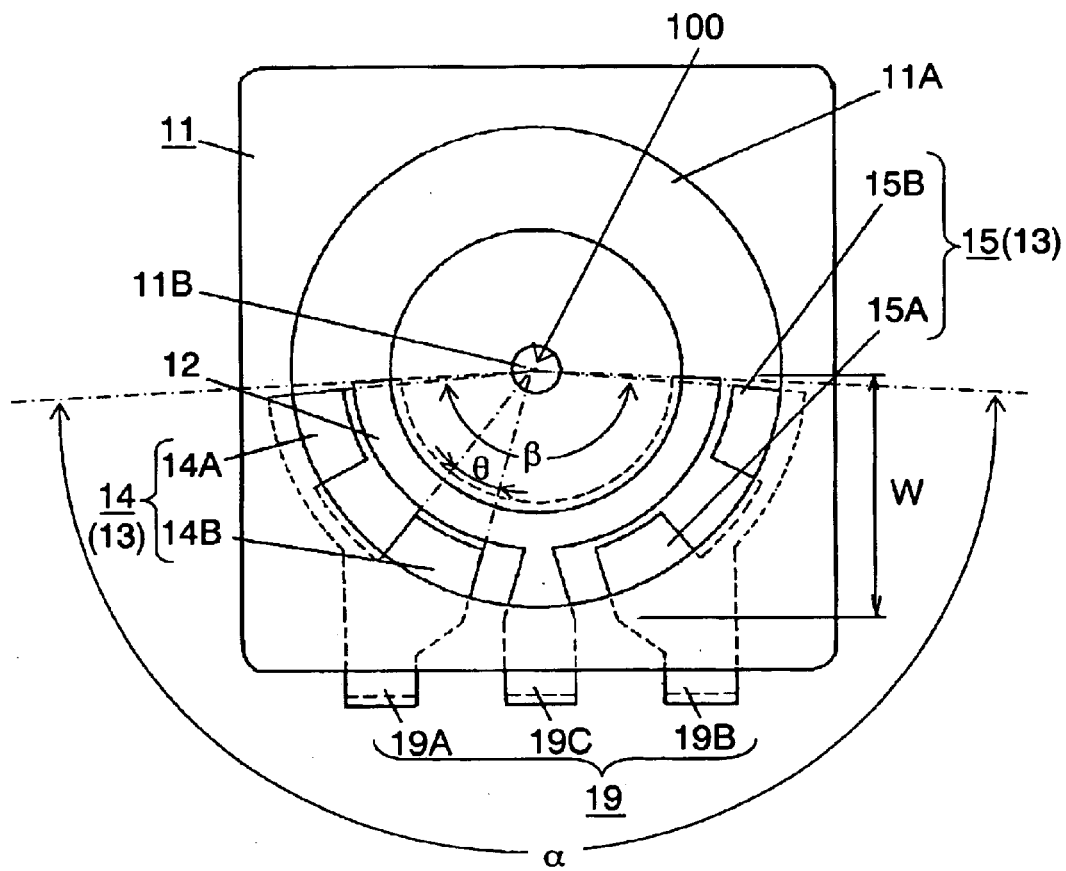
FIG. 2 is a plan view depicting a housing case of the rotary encoder according to the exemplary embodiment of this invention.
Figure 3:
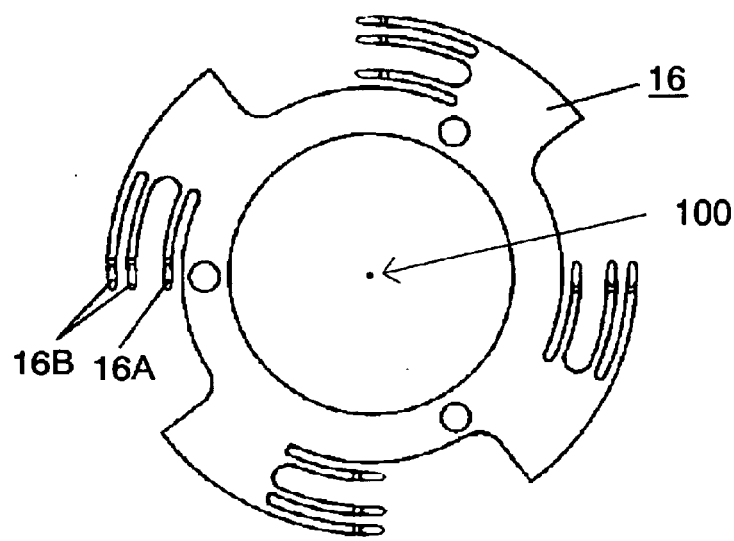
FIG. 3 is a plan view depicting a sliding contact of the rotary encoder according to the exemplary embodiment of this invention.

Common electrode 12 and signal electrode 13 fixed to housing case 11 by insert molding are in concentrical with center axis 100 of central hole 11B in housing case 11, and located in the same circumferential area within an angular range of approximately ½ of the entire circumference (i.e., 180 degrees) as shown in FIG. 2.

Signal electrode 13 comprises signal electrode 14 for A-phase and signal electrode 15 for B-phase, and they are formed in a manner so that they are exposed on the bottom surface of recess 11A inside housing case 11. Signal electrode 14 for A-phase comprises two contact electrodes 14A and 14B having electrical continuity to each other, and signal electrode 15 for B-phase comprises two electrodes 15A and 15B also having electrical continuity to each other. These contact electrodes 14A, 14B, 15A and 15B are arranged side by side along the same circumference.

Although contact electrodes 14A, 14B, 15A and 15B are of the same size and same angular arrangement as those shown in the reference example shown in FIG. 11, these contact electrodes are disposed to an area approximately one half of the entire circumference because they are only half in the number.

As shown in FIG. 2, signal electrode 14 for A-phase and signal electrode 15 for B-phase are so arranged that their relative positions are shifted along a direction of the circumference by an angle ½ of angle "θ" occupied by each of the contact electrodes (i.e., θ/2).

Common electrode 12 is formed into a shape of semicircular ring in the position inside signal electrode 13, so that an angular range denoted by symbol "α" within which the circular arc common electrode 12 is disposed is slightly larger than another angular range denoted by symbol "β" between one end of contact electrode 14A located at the outermost side of signal electrode 14 for A-phase and another end of electrode 15B located at the opposite outermost side of signal electrode 15 for B-phase.

Common electrode 12, signal electrode 14 for A-phase and signal electrode 15 for B-phase are electrically isolated from one another, and connected to their respective connecting terminals 19A, 19B and 19C extending to the outside of housing case 11, for connections with an external circuit. These connecting terminals 19A, 19B and 19C are hereinafter referred to as connecting terminals 19.

On the other hand, sliding contact 16 secured to the underside surface of operating shaft 17 has a structure provided with four combinations of contacts points arranged at four equally divided angular positions, or every 90 degrees along the same circumference about the rotary axis 100, and that each of the combinations comprises contact point 16A on the inner side for sliding (i.e., traveling while making electrical contact) on common electrode 12 and two contact points 16B on the outer side for sliding on signal electrode 13, as shown in FIG. 3. In other words, sliding contact 16 has four contact points 16A and eight contact points 16B. For each combination, contact points 16A and 16B are aligned side by side along the radial direction of rotary axis 100.

The rotary encoder according to this exemplary embodiment is constructed as described above so that sliding contact 16 rotates in relation to housing case 11 when operating shaft 17 is turned. During this rotary motion, contact point 16A on the inside slides on common electrode 12, and two contact points 16B on the outside slide over contact electrodes 14A and 14B of signal electrode 14 for A-phase and contact electrodes 15A and 15B of signal electrode 15 for B-phase in a manner to contact and separate regularly (i.e., making and breaking electrical continuity).

The sliding movement of these four combinations of contact points 16A and 16B of sliding contact 16 produces outputs of A-phase rectangular waves continuously between terminals 19A and 19C, and another series of outputs of B-phase rectangular waves between terminals 19B and 19C of which rise points are shifted by ½ in phase.

Since sliding contact 16 is provided with the four combinations of contact points 16A and 16B for sliding over common electrode 12 and signal electrode 13 at four equally divided locations around the circumference, each combination of contact points 16A and 16B makes and breaks electrical continuity to two contact electrodes 14A and 14B for A-phase in a sequential order. This produces eight outputs of rectangular waves in A-phase. Similarly, contact points 16A and 16B makes and breaks electrical continuity to two contact electrodes 15A and 15B for B-phase in the like sequentially manner to produce eight outputs of rectangular waves, which are different in phase from the A-phase outputs.

Because each combination of contact points 16A and 16B are arranged in alignment with the radial direction of central axis 100, common electrode 12 needs to be formed only in an angular range equal to or slightly larger than that of signal electrode 13 along the circumference. This arrangement allows the individual combinations of contact points 16A and 16B to slide on common electrode 12 and signal electrode 13 simultaneously, thereby making the encoder capable of producing the desired outputs of rectangular waves.

When the individual combinations of contact points 16A and 16B are constructed uniformly flexible at their equally divided positions along the circumference, they provide excellent steadiness in making contacts with less influence of leverage, thereby producing stable outputs.

As described, the rotary encoder according to this exemplary embodiment can thus produce desired outputs of rectangular waves even though signal electrode 13 is disposed within the area (i.e., angular range of "β") that is narrower than the entire circumference concentrical to it.

Moreover, in the rotary encoder of this exemplary embodiment, since electrode portions serving common electrode 12 and signal electrode 13 are formed into narrow width "W" (refer to FIG. 2), this structure can decrease a width dimension of the electrode material, or a sheet metal of good electrical conductivity, thereby reducing the material cost.

In addition, since this structure can decrease distances required for contact points 16A and 16B of sliding contact 16 to slide on common electrode 12 and contact electrodes 14A, 14B, 15A and 15B of signal electrode 13 per each rotation, it improves durability of contact points 16A and 16B to sliding abrasion.

Furthermore, because common electrode 12 is disposed to the inner side of signal electrode 13, a circular arc length of common electrode 12 can be shortened. This can also increase durability of contact point 16A located on the inside for sliding on common electrode 12.

Figure 4:
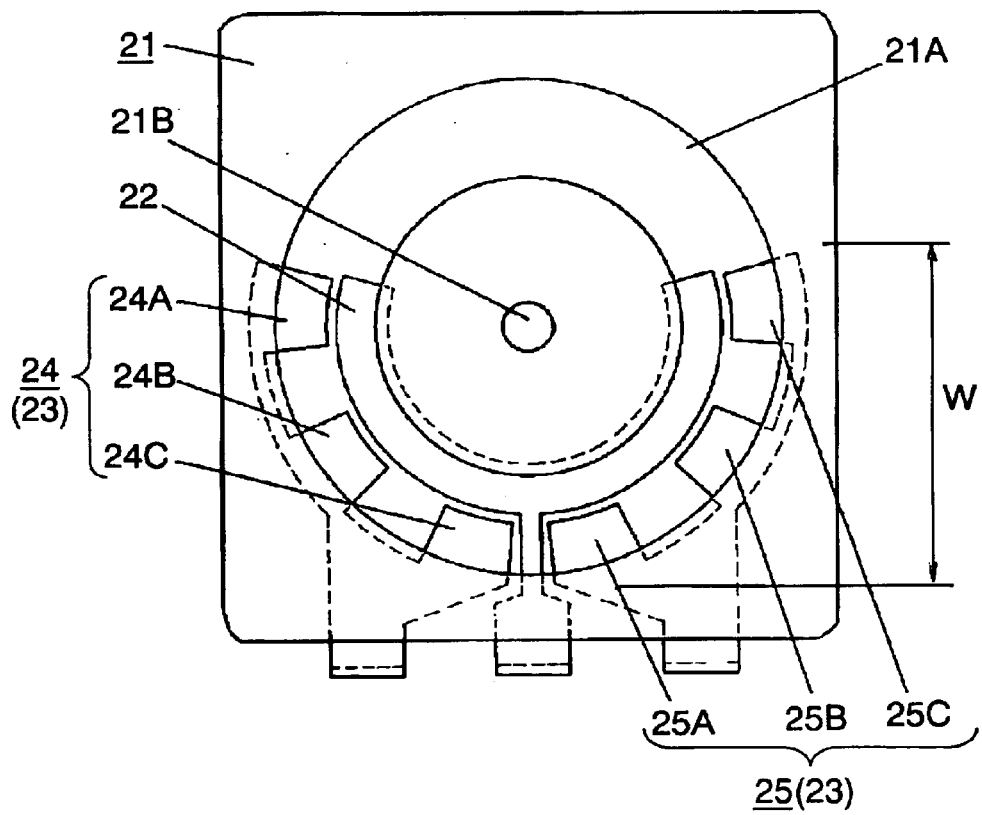
FIG. 4 is a plan view depicting another example of a housing case having a different structure for the rotary encoder according to the exemplary embodiment of this invention.
Figure 5:
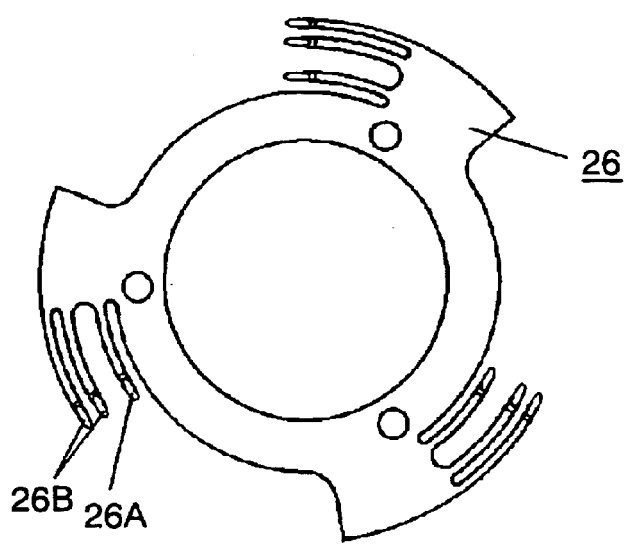
FIG. 5 is a plan view depicting a sliding contact for use in combination with the housing case of FIG. 4.

Referring to FIG. 4 and FIG. 5, description is provided next of another example wherein the invention is applied to a rotary encoder that produces an output of rectangular wave nine times per each rotation.

In this example, housing case 21 made of an insulating resin is provided on a bottom surface of recess 21A with common electrode 22 of a circular arc shape disposed in concentric to central hole 21B, and signal electrode 23 also disposed to the outside of and in concentric to common electrode 22, both in angular ranges narrower than the entire circumference of housing case 21, as shown in FIG. 4. Signal electrode 23 comprises signal electrode 24 for A-phase fixed to the bottom surface in a manner to expose three electrodes 24A, 24B and 24C, and another signal electrode 25 for B-phase also fixed to the bottom surface in the same manner to expose three electrodes 25A, 25B and 25C.

In confronting the above common electrode 22 and signal electrode 23, on the other hand, sliding contact 26 has three combinations of contacts points 26A and 26B arranged at three equally divided angular positions, or every 120 degrees along the same circumference, and that each of the combinations comprising inner side contact point 26A and two outer side contact points 26B are aligned radially, as shown in FIG. 5.

In the rotary encoder of this structure, sliding contact 26 rotates in relation to housing case 21 when an operating shaft (not shown in the figure) is turned. This makes contact point 26A travel rotatory on common electrode 22, and two contact points 26B on the outer side travel rotatory on signal electrode 23. In other words, contact points 26B slide over contact electrodes 24A, 24B and 24C of signal electrode 24 for A-phase, and contact electrodes 25A, 25B and 25C of signal electrode 25 for B-phase.

As the operating shaft is turned, the three combinations of contacts points 26A and 26B of sliding contact 26 come into contact with and separate from (i.e., make and break electrical continuity with) three contact electrodes 24A, 24B and 24C for A-phase in a sequential manner to produce A-phase output of rectangular wave nine times per each rotation. At the same time, the three combinations of contacts points 26A and 26B come into contact with and separate from three contact electrodes 25A, 25B and 25C for B-phase to produce B-phase output of rectangular wave nine times.

Since this embodiment can also produce desired outputs of rectangular waves with the structure having the electrode portions serving common electrode 22 and signal electrode 23 of width "W" (refer to FIG. 4) disposed within an area narrower than the entire circumference thereof, it can reduce a width of the electrode material, thereby reducing the material cost as well as improving the durability in operation.

Figure 6:
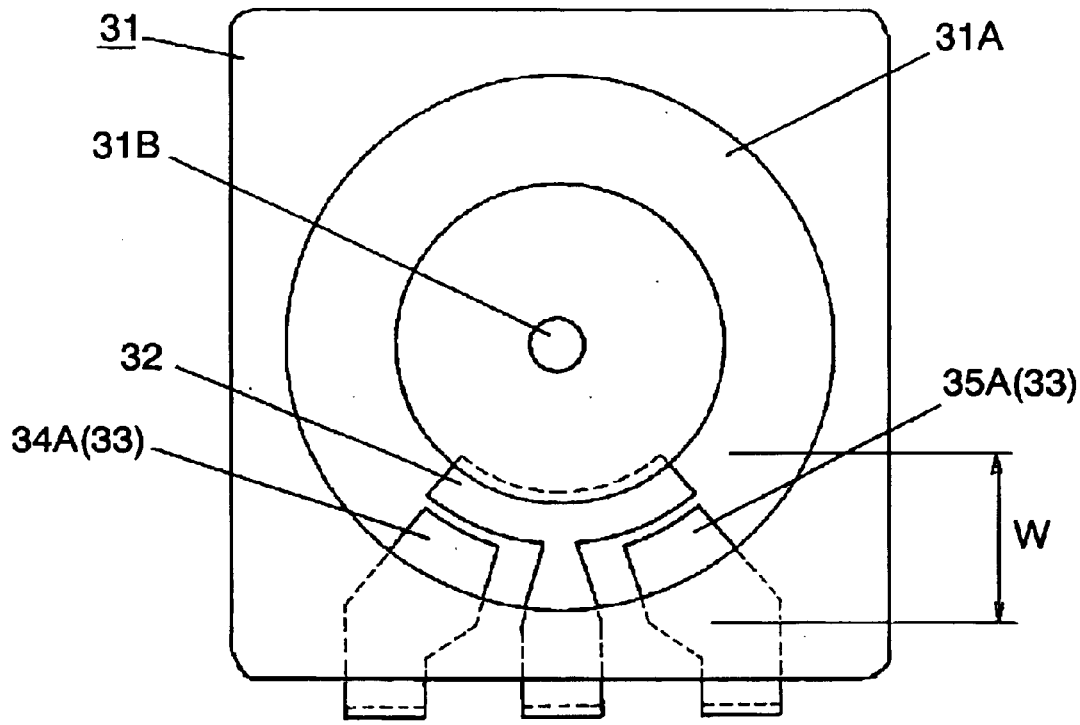
FIG. 6 is a plan view depicting a housing case of a rotary encoder according to the exemplary embodiment of this invention.
Figure 7:
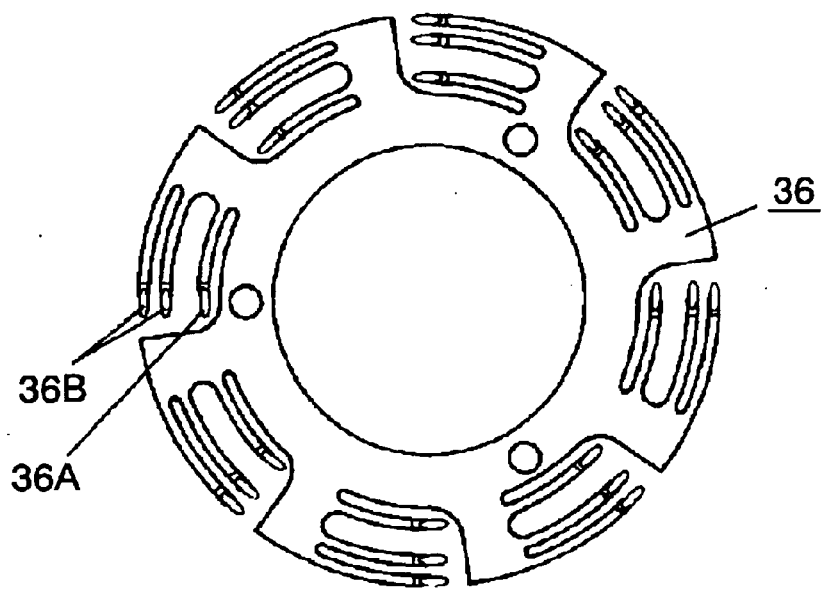
FIG. 7 is a plan view depicting a sliding contact of the rotary encoder according to the exemplary embodiment of this invention.

Referring to FIG. 6 and FIG. 7, another rotary encoder in the exemplary embodiment of this invention is shown.

The rotary encoder has such a structure that each phase of signal electrodes is disposed only to one place, and a sliding contact provided corresponding to and in concentric with the signal electrodes has the same number of contact points as that of rectangular waves to be output per one complete rotation of the encoder.

In FIG. 6, housing case 31 made of an insulating resin is provided, on a bottom surface of open-top recess 31A, with common electrode 32 of a circular arc shape disposed within a narrow angular range and in concentric to central hole 31B, and signal electrode 33 disposed to the outside of and in concentric with common electrode 32.

Signal electrode 33 comprises one each of contact electrode 34A serving as a signal electrode for A-phase and contact electrode 35A as a signal electrode for B-phase, and they are fixed side by side to the bottom surface of recess 31A in housing case 31 in a manner to expose surfaces of contact electrodes 34A and 35A. On the other hand, common electrode 32 is formed into an angle slightly larger than an angular range configured by contact electrodes 34A and 35A, and so fixed as to be exposed to on the bottom surface of recess 31A.

Sliding contact 36 shown in FIG. 7 is an example which includes contact points of the same number as that of rectangular wave outputs required in one full rotation of sliding contact 36, disposed to positions equally angled through the same circumference. FIG. 7 illustrates sliding contact 36 having eight combinations of contact points 36A and 36B arranged along the radial direction, and that each of the combinations comprises inner side contact point 36A and two outer side contact points 36B.

In the rotary encoder provided with the above contact unit according to the exemplary embodiment, sliding contact 36 fixed to an operating shaft (not shown in the figure) rotates in relation to housing case 31 when the operating shaft is turned. During one full rotation, the rotary encoder produces eight each of rectangular wave outputs for both A-phase and B-phase, since the eight combinations of contact points 36A and 36B (at eight places) on sliding contact 36 slide on common electrode 32 and contact electrodes 34A and 35A of the signal electrode, and each comes into contact therewith once.

As described, the rotary encoder can produce the desired number of rectangular wave outputs by providing only one each of contact electrodes 34A and 35A for respective phases as signal electrode 33. Therefore, the structure shown in FIG. 6 and FIG. 7 makes possible the narrowest width "W" of the electrode portion that composes common electrode 32 and signal electrode 33 (refer to FIG. 6). As a result, it can decrease a width of the electrode material, or a sheet metal of good electrical conductivity to the smallest dimension possible, and thereby it can reduce the material cost.

Furthermore, this structure also improves durability of contact points 36A and 36B, and prolongs the useful life, since it can decrease distances to the shortest possible for contact points 36A and 36B of sliding contact 36 to travel on the electrodes.

Figure 8:
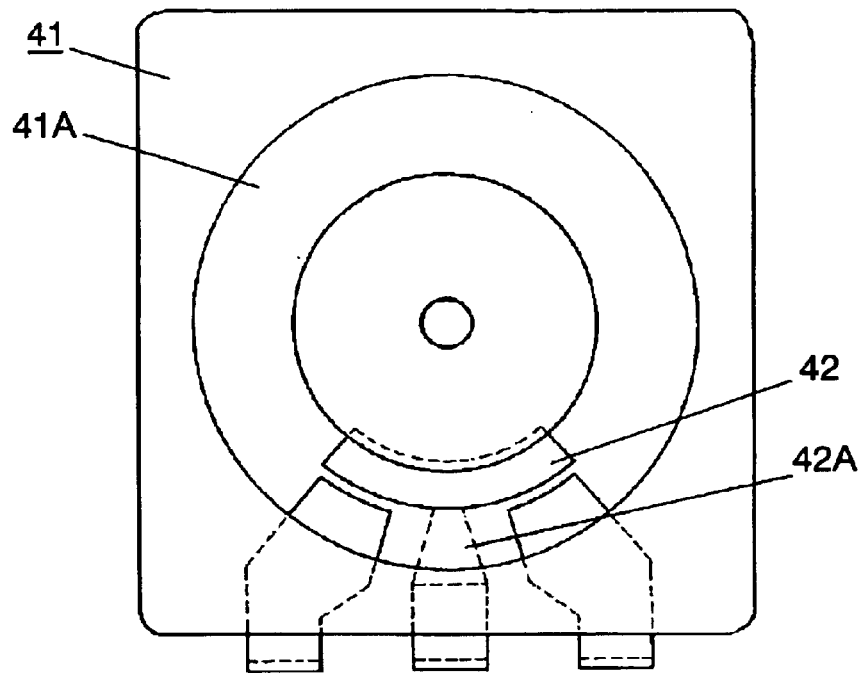
FIG. 8 is a plan view depicting another example of housing case having a different structure for the rotary encoder according to the exemplary embodiment of this invention.

In addition, a structure shown in FIG. 8 can further reduce a surface area of the electrode portion where contact points 36B of sliding contact 36 slide, if a leading portion 42A of common electrode 42 to the exterior is embedded as shown into the insulating resin under the bottom surface of recess 41A of housing case 41, so as to further improve the durability to sliding abrasion.

In the above exemplary embodiments, although what have been described are the rotary encoders of dual phase having A-phase and B-phase outputs, an idea of this invention is also applicable to any rotary encoder of three or more phases.

Figure 9:
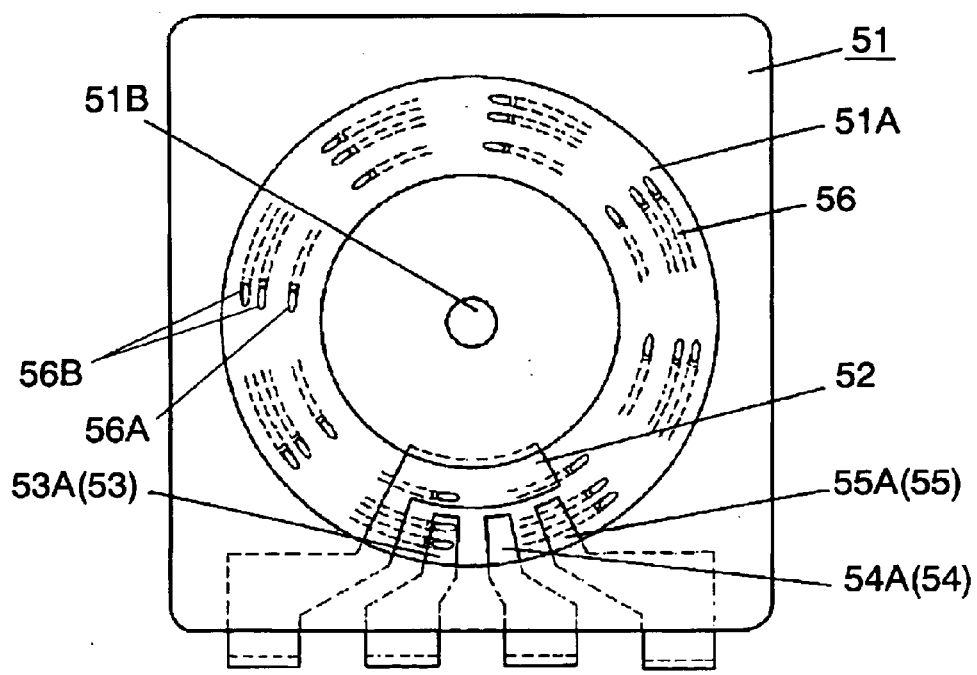
FIG. 9 is a plan view depicting still another example of housing case having a different structure for the rotary encoder according to the exemplary embodiment of this invention.

FIG. 9 shows one such example. Housing case 51 is provided on a bottom surface of recess 51A with common electrode 52 in concentric to central hole 51B, and signal electrodes 53, 54 and 55 for three phases, A-phase, B-phase and C-phase, along the circumference at the outside of and in concentric with common electrode 52. Portions of signal electrodes 53, 54 and 55 exposed on the bottom surface of recess 51A are referred to as contact electrodes 53A, 54A and 55A respectively. On the other hand, sliding contact 56 includes contact point 56A for making contact with common electrode 52 and contact point 56B for making contact with contact electrodes 53A, 54A and 55A, and that these contact points 56A and 56B of the same number as that of rectangular wave outputs are formed at equally angled positions around a circumference concentric with the electrodes.

In this instance, the signal electrodes for three phases can be arranged evenly so that an angle formed by all of contact electrodes 53A, 54A and 55A lies inside of an angular range derived by dividing 360 degrees by the desired number of rectangular wave outputs. In the structure of FIG. 9, the rotary encoder produces a rectangular wave output of each phase eight times per each rotation of the operating shaft, since the contact points at eight locations come into contact to and separate from each of the contact electrodes for A-phase, B-phase and C-phase.

According to the exemplary embodiments, as described above, the invention realizes a rotary encoder with capability of producing a desired number of rectangular wave outputs even if the electrodes are not disposed to the entire area of the circumference. This can thus decrease a width of a sheet metal of good electrical conductivity to form the electrodes, and thereby it can reduce the material cost.

Since the rotary encoder of the above structure can reduce an area where the electrodes are exposed to on the bottom surface of the recess in the housing case, it can decrease a distance through which contact points of the sliding contact slide on the electrodes, and thereby the encoder has superior durability to sliding abrasion.

In addition, this invention achieves outstanding steadiness of the electrical contacts enabling the rotary encoder to produce steady outputs by simply arranging the contact points for sliding the electrodes to positions that equally divide the circumference of the sliding contact.

In the above exemplary embodiments, although the description was given of the structures provided with the electrodes on the fixed component side, and the sliding contact retained rotatable, this is not restrictive. The invention can provide the same advantages even if sliding contact is disposed to the fixed component side, and the electrodes are retained rotatable.

It will be obvious to those skilled in the art that various changes may be made in the above-described embodiments of the present invention. However, the scope on the present invention should be determined by the following claims.

What is claimed is:

1. A rotary encoder having a housing case provided with a common electrode and a plurality of signal electrodes, and a rotatable sliding contact in relation to the housing case, wherein the common electrode is formed within a first angular range along a first circumference, the plurality of signal electrodes are formed within a second angular range along a second circumference of a different radius than the first circumference and have a center point concentrical with the first circumference, the first angular range is equal to or slightly wider than the second angular range, and contact points provided on the sliding contact slide regularly on the signal electrodes and the common electrode to produce continuous output of rectangular waves.

2. The rotary encoder according to claim 1, wherein the contact points are provided on equally divided angular positions along the circumference, and the contact points travel and come into contact with the plurality of electrodes in a sequential manner to produce the continuous output of rectangular waves.

3. The rotary encoder according to claim 2, wherein each of the signal electrodes has one contact electrode, the contact electrode produces a single rectangular wave, and the sliding contact has the same number of contact points as a number of rectangular wave outputs necessary to produce per one full rotary operation.

4. The rotary encoder according to claim 1, wherein the common electrode is disposed to an inner side of the plurality of signal electrodes.

5. The rotary encoder according to claim 4, wherein a leading portion of the common electrode is embedded in the housing case.

6. A rotary encoder comprising:

a housing case;

an operating member disposed to the housing case in a rotatable manner about a predetermined center point on a bottom surface of the housing case;

a common electrode of circular arc shape formed continuously within a first angular range along an area of a first radius from the center point on the bottom surface of the housing case;

a signal electrode formed within a second angular range along an area of a second radius from the center point; and a sliding contact fixed to an underside surface of the operating member for making a rotary movement on the bottom surface of the housing case, wherein the signal electrode is disposed to at least two locations with electrical isolation to each other, and each of the signal electrodes has a contact electrode for making electrical contact with the sliding contact, the first angular range is slightly larger than the second angular range, and the sliding contact has a first contact point for making electrical contact with the common electrode at the area of the first radius and a plurality of second contact points for making electrical contact with the contact electrodes at the area of the second radius, and the first contact point and the plurality of second contact points are disposed to same angular position.

7. The rotary encoder according to claim 6, wherein the sliding contact has at least three combinations of the first contact point and the second contact points.

8. The rotary encoders according to claim 6, wherein each of the signal electrodes has at least two contact electrodes.

9. The rotary encoder according to claim 6, wherein each of the signal electrodes has one contact electrode, and the sliding contact has the same number of combinations of the first contact point and the second contact points as a desired number of rectangular wave outputs.

10. The rotary encoder according to claim 6, wherein the signal electrode is disposed to at least three locations with electrical isolation to one another, each of the signal electrodes has a contact electrode, and the sliding contact has the same number of combinations of the first contact point and the second contact points as a desired number of rectangular wave outputs.

* * * * *